Oct. 16, 1928.

L. J. GREENAWALT 1,687,664

THERMOSTAT

Filed June 23, 1926

WITNESSES:
J.H.Voelker.
A.R.Greene

INVENTOR
Lewis J.Greenawalt.
BY
Wesley G.Barr
ATTORNEY

Patented Oct. 16, 1928.

1,687,664

UNITED STATES PATENT OFFICE.

LEWIS J. GREENAWALT, OF MANSFIELD, OHIO, ASSIGNOR TO WESTINGHOUSE ELECTRIC & MANUFACTURING COMPANY, A CORPORATION OF PENNSYLVANIA.

THERMOSTAT.

Application filed June 23, 1926. Serial No. 117,952.

My invention relates to thermostats and particularly to thermostats employed in thermostatic switches.

An object of my invention is to provide a simple and efficient thermostat that may be manufactured at a relatively low cost.

Another object of my invention is to provide guide means for a thermostat that will provide a uniform resistance to any tendency of the thermostat to rotate or shift from its normal position.

Another object of my invention is to provide guide means for a thermostat that will not hamper the action of the thermostat.

Another object of my invention is to provide means in a thermostat switch for maintaining the circuit-closing member in the proper operative position.

Another object of my invention is to provide a thermostatic switch that may be readily and easily assembled.

Other objects will be apparent from the disclosure.

In the operation of thermostats of the type shown in patent to J. A. Spencer, No. 1,448,240, patented March 13, 1923, in which a snap-acting thermostat comprising a non-developable sheet of two metals having different thermal coefficients is described, it has been found desirable to mount the circuit-closing members near the perimeter of the thermostat instead of at its center and to support the thermostat by suitable means engaging its center instead of its perimeter. A means, such as a guide pin, is provided to prevent the thermostat from rotating about its support.

It has previously been the custom to so position this guide pin as to extend through a hole in, and loosely engage, the thermostat near its perimeter. I have discovered that, when the guide pin is so positioned, there will be more interference with the action of the thermostat in case of friction between the pin and the thermostat than if the guide means is positioned to engage the thermostat near the center. This is because the area or zone of maximum deflection of the thermostat is near its perimeter while its zone of minimum deflection is near its center. Furthermore, the retarding force due to friction has more leverage near the perimeter than near the center of the thermostat.

I have found also that, by providing a plurality of spaced pins instead of one, the interference with the action of the thermostat is reduced, since a more uniform resistance to the tendency of the thermostat to rotate, is secured.

In the manner of practicing my invention herein disclosed, I provide a base member or supporting plate, a stud secured to a sleeve carried by the base member, a bimetallic thermostatic disc of the Spencer type secured, at its center, to the stud, and registering circuit-closing members on the thermostatic disc and the plate near their perimeters and insulated therefrom. To prevent the thermostat from rotating, I provide a plate having guide means thereon, said guide means engaging the thermostat near its center. This plate is rigidly secured to the base member by suitable means.

Figure 1:
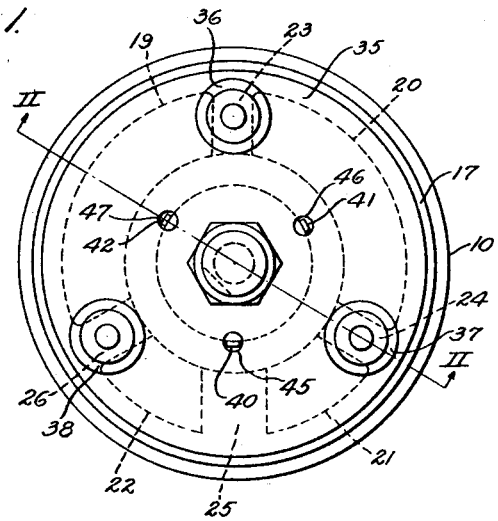
Figure 1 is a top plan view of my improved thermostatic switch.

Referring to the drawings, 10 indicates a base member or supporting element which is preferably composed of two sheets of metal. An internally threaded sleeve 12 fits snugly in a hole 14 in the center of the base member and has a flange 15 which rests against the lower portion of the base member 10. The sleeve 12 has a segmental recess 16 for the purpose hereinafter stated. A sheet 17 of insulating material, preferably mica, has an opening 18 in its center that is adapted to receive the sleeve 12, thereby permitting the mica sheet 17 to rest on the supporting plate 10.

An annularly arranged series of stationary contact members 19, 20, 21 and 22 rest upon the mica sheet 17 and are rigidly secured, by suitable means such as rivets (not shown), to the base member 10. Contact members 19 and 20 have an air space or gap 23 therebetween; contact members 20 and 21 have an air space 24 between them; contact members 21 and 22 have an air space 25 between them, and contact members 19 and 22 have an air space 26 between them.

A second sheet of insulating material 27 fits within the annular row of stationary contact members and is provided with an opening 28 at its center for fitting over the sleeve 12 and permitting it to rest upon the mica sheet 17.

A stud 29 has an externally threaded portion which engages the internally threaded portion of the sleeve 14. The stud 29 is locked by means of a locking nut 30 secured on the lower end of the stud and bearing against a washer 31, that, in turn, bears against the flange 15 of the sleeve 14. The top of the stud is provided with a flange 32 and a projecting portion 33 that extends through a hole 34 at the center of a bimetallic thermostat disc 35, preferably of the type of thermostat disclosed in the patent to Spencer above mentioned.

The thermostat 35 is secured on the portion 33 of the stud by suitable means, such as a washer 35' that bears against it, and is held in place by upsetting the upper end of the stud. Loosely and insulatedly mounted on the under side of the thermostat, near the periphery thereof, are a series of circuit closing members 36, 37 and 38 that respectively bridge the air gaps 23, 24 and 26 and engage, and electrically connect, the corresponding stationary contact members when the thermostat is in the position shown in Fig. 2.

The stationary members 21 and 22 are provided with suitable means, such as terminal posts (not shown), to connect them with a pair of conductors. It will be seen that a current, traversing the corresponding terminal post to the contact member 21, will flow through the contact member 21, the bridging contact member 37, the stationary contact member 20, the bridging contact member 36, the stationary contact member 19, the bridging contact member 38, and the stationary contact member 22 to the other terminal post when the thermostatic disc is in the position shown in Fig. 2.

To prevent rotation of the thermostat, a guide member or plate 39, having prongs or guide lugs 40, 41 and 42 thereon, is provided. This guide member has a substantially circular opening 43 with a straight portion 44 so shaped as to adapt it to fit in the segmental recess 16 of the sleeve 14. The guide plate 39 is slipped over the top of the sleeve 14, the part 44 registering with the part 16, thus permitting the plate 39 to rest upon the insulation sheet 27 and to be locked to the sleeve 14.

The guide pins or lugs 40, 41 and 42 extend upwardly through openings 45, 46 and 47 in the thermostatic disc. These openings are larger than the guide pins to permit a loose engagement of the guide pins with the thermostatic disc. To prevent the plate 39 from slipping off the sleeve 14 and to secure the stud 29 and the mica sheet 27 in place, the upper portion of the sleeve 14 is bent or turned over, as indicated at 48.

The holes 45, 46 and 47 are, as shown, close to the center of the thermostatic disc. The guide lugs 40, 41 and 42 are, therefore, within the minimum deflection zone or area of the thermostat, since the thermostat is secured, at its center, to the stud 29 and, of course, the portion of the thermostat at the center will not be deflected, when thermal conditions change, as much as the portion near the edge or perimeter of the thermostat, which may be spoken of as being the area or zone of maximum deflection.

Figure 2:
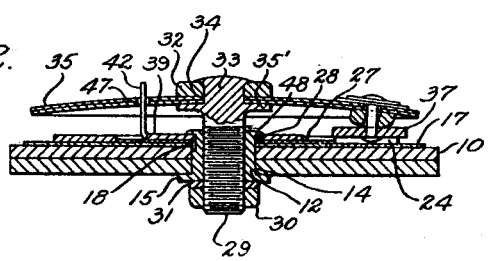
Fig. 2 is a sectional view taken on the line II—II of Fig. 1.
Figure 3:
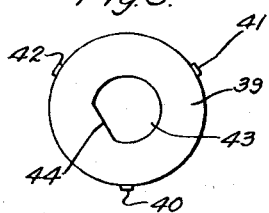
Fig. 3 is a top plan view of the guide member.
Figure 4:
Fig. 4 is an elevational view of the guide member.
Figure 5:
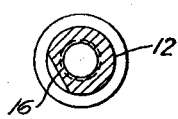
Fig. 5 is a transverse sectional view of the sleeve showing a segment cut out to furnish locking means for the guide member.

When a predetermined thermal change takes place in the vicinity of the thermostatic switch, a sudden curving of the thermostat 35 in the opposite direction to that shown in Fig. 2, will take place. This snaps the bridging contact members away from the stationary contact members, thus quickly breaking the circuit.

The guide members prevent any rotation of the thermostat when it thus changes its position. Since there are a plurality of guide members, the resistance to this rotating tendency of the thermostat will be more uniformly distributed throughout the area of the thermostat than would be the case if only one guide pin were used. As previously stated, since the guide pins are located within the zone of minimum deflection, they will not interfere with the action of the thermostat as much as if they were in the zone of maximum deflection.

While I have shown and described, for purposes of illustration, a specific embodiment of my invention, my invention may, of course, be embodied in other forms without departing from the spirit and scope thereof as set forth in the appended claims.

I claim as my invention:

1. In a thermostatic switch, in combination, a supporting plate, a thermostatic disc mounted on said supporting plate in spaced relation thereto and having a maximum-deflection zone and a minimum-deflection zone, a plurality of stationary contact members insulatedly mounted on said supporting plate, adjacent contact members being separated by air gaps, a plurality of bridging contact members insulatedly mounted on said thermostatic disc within the maximum-deflection zone, each of said bridging contact members being in register with a gap and being adapted, upon response of said thermostatic disc to a predetermined thermal change, to bridge said gap and electrically connect the adjacent stationary contact members separated by said gap, and a guide member associated with said thermostatic disc at a point within the minimum-deflection zone for maintaining each of said bridging contact members in register with the corresponding gap.

2. In a thermostatic switch, in combination, a supporting plate, a stud secured to said supporting plate, a thermostatic disc having a hole in its center for engaging the free end of said stud, a series of annularly arranged stationary contact members insulatedly mounted on said supporting plate, adjacent contact members being separated by air gaps, a series of bridging contact members insulatedly mounted on said thermostatic disc near its perimeter, said bridging contact members normally bridging corresponding gaps and electrically connecting the stationary contact members, and a plurality of guide members rigidly mounted on said supporting plate and loosely engaging said thermostatic disc near its center for maintaining said bridging contact members in register with corresponding gaps.

3. In a thermostatic switch, in combination, a base member having a hole in its center, a sleeve positioned in said hole, a plate engaging said sleeve, means for locking said plate to said sleeve, means for rigidly securing said sleeve to said base member, a stud secured to said sleeve, a thermostatic disc, said stud engaging said thermostatic disc at its center for securing said disc in spaced relation to said base member, a circuit-closing member mounted on said thermostatic disc near the perimeter, said plate having integral guide members, said guide members loosely engaging said thermostatic disc near its center for maintaining said circuit-closing member in operable position.

4. In a thermostatic switch, in combination, a base member, a thermostatic disc mounted in spaced relation thereto, a circuit-closing member on said disc, a sheet of insulation on said base member, means secured to said base member for securing said sheet of insulation to said base member, said means comprising a guide member loosely engaging said disc for maintaining said circuit-closing member in operable position.

5. In a thermostatic switch, in combination, a base member, a thermostatic disc mounted on said base member in spaced relation thereto, a bridging contact member insulatedly mounted on said disc near its perimeter, an insulating sheet positioned on said base member, a pair of stationary contact members in register with said bridging contact members, said stationary contact members being positioned on said insulating sheet and secured to said base member, a second insulating sheet positioned on said first insulating sheet, a plate having guide lugs integral therewith, said plate being positioned on said second insulating sheet and rigidly secured to said base member, said guide lugs loosely engaging said thermostatic disc near its center for maintaining said bridging contact member in register with said stationary contact members.

6. A thermostatic device comprising a base, a stud extending through said base and having adjustable engagement therewith, a thermostatic disc loosely mounted at one end of said stud, said disc having a plurality of openings therein, and a member having a plurality of upturned lugs mounted upon said base, said lugs being disposed to extend through said openings to prevent said disc from turning on said stud.

7. In combination, a base, a member having a plurality of spaced integral upturned lugs mounted thereon, a clamping member for securing said base and member together, a stud adjustably engaging said clamping member, and a thermostatic disc loosely mounted on said stud, said disc having a plurality of spaced openings through which said lugs extend whereby said disc is prevented from turning on said stud.

In testimony whereof, I have hereunto subscribed my name this 17 day of June, 1926.

LEWIS J. GREENAWALT.